United States Patent [19]

Matsuzaki et al.

[11] 4,315,134
[45] Feb. 9, 1982

[54] HEATING FILAMENT ARRANGEMENT FOR UNIFORMLY ELECTRICALLY HEATING A VEHICULAR WRAP-AROUND TYPE REAR WINDOWSCREEN

[75] Inventors: Kiyoto Matsuzaki; Shojiro Seki; Norimoto Aya, all of Yokohama, Japan

[73] Assignee: Nissan Motor Company, Limited, Yokohama, Japan

[21] Appl. No.: 38,275

[22] Filed: May 11, 1979

[30] Foreign Application Priority Data

May 17, 1978 [JP] Japan .................................. 53-64963

[51] Int. Cl.³ .......................... H05B 3/06; E06B 7/12; A47L 1/16; B60J 1/20
[52] U.S. Cl. ..................................... 219/203; 52/171; 219/522; 219/543; 219/547; 338/308; 338/309; 428/195
[58] Field of Search ............... 219/203, 522, 547, 543; 52/171; 296/85, 84 R, 84 H; 65/107; 427/108-110; 428/195; 338/308, 309

[56] References Cited

U.S. PATENT DOCUMENTS

| | | | |
|---|---|---|---|
| 2,878,357 | 3/1959 | Thomson et al. | 219/203 X |
| 3,475,588 | 10/1969 | McMaster | 219/203 |
| 3,553,833 | 1/1971 | Jochim et al. | 219/203 X |
| 4,109,044 | 8/1978 | Marriott | 219/547 X |

Primary Examiner—Anthony Bartis
Attorney, Agent, or Firm—Schwartz, Jeffery, Schwaab, Mack, Blumenthal & Koch

[57] ABSTRACT

A first group of heating filaments is printed on a main section of a wrap-around type rear windowscreen and second and third groups of heating filaments each having a reduced width are printed on side sections of the rear windowscreen between which the main section is interposed. The second and third groups of heating filaments are integrally connected, in one to one relation, to the first group of heating filaments at ridges of the windowscreen by which ridges the main section and the side sections are bound respectively. First highly conductive strips to which the second and third groups of heating filaments are terminated are respectively printed on the side sections. Second highly conductive strips are printed on the ridges to extend along the same while crossing the connecting parts of the first and second, and the first and third groups of heating filaments to connect the same. Third highly conductive strips are printed on the side sections to connect the top ends of the first and second highly conductive strips and to connect the bottom ends of the first and second highly conductive strips.

3 Claims, 4 Drawing Figures

U.S. Patent  Feb. 9, 1982  4,315,134
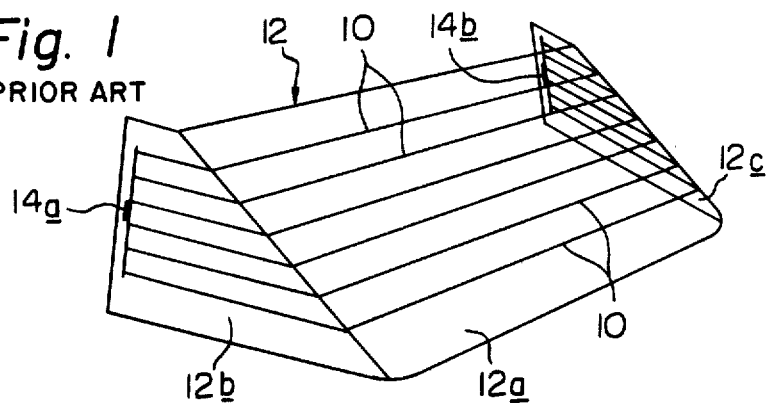
Fig. 1 PRIOR ART
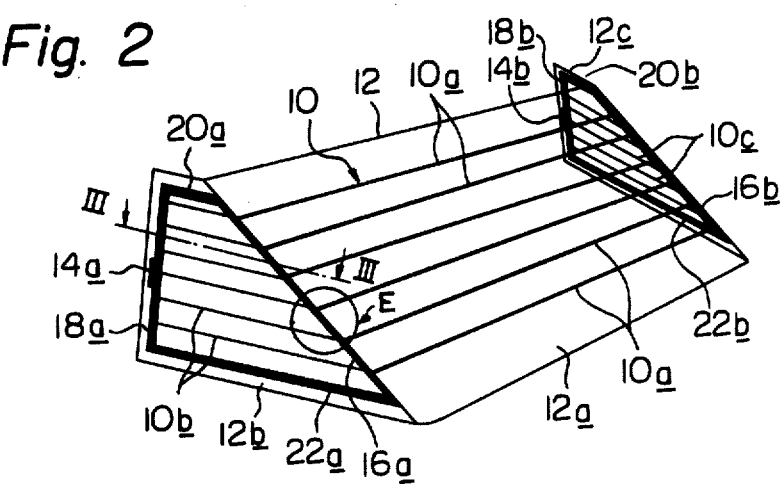
Fig. 2
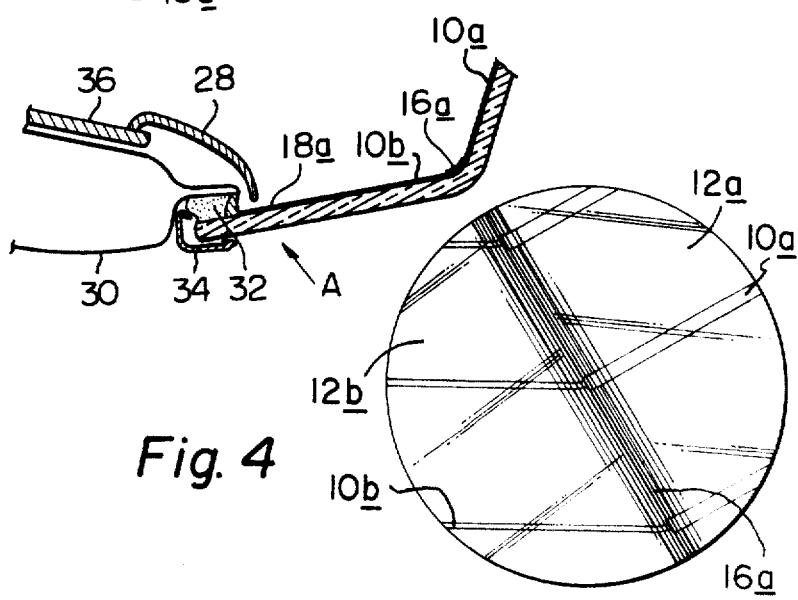
Fig. 3
Fig. 4

HEATING FILAMENT ARRANGEMENT FOR UNIFORMLY ELECTRICALLY HEATING A VEHICULAR WRAP-AROUND TYPE REAR WINDOWSCREEN

FIELD OF THE INVENTION

The present invention relates in general to a vehicular windowscreen having an electric demister, and more particularly to a vehicular wrap-around type rear windowscreen on which heating filaments constituting a demister are printed.

SUMMARY OF THE INVENTION

It is an object of the present invention to provide a vehicular wrap-around type rear windowscreen on which heating filaments are printed, by which filaments an equal heating effect appears over the total surface of the windowscreen.

It is another object of the present invention to provide a wrap-around type rear windowscreen on which heating filaments are printed, which filaments never disturb the view provided through the windowscreen.

It is still another object of the present invention to provide a wrap-around type rear windowscreen on which heating filaments are printed, part of the filaments acting as garnish of the vehicle.

Other objects and advantages of the present invention will become clear from the following description when taken in conjunction with the accompanying drawings.

In accomplishing the foregoing objects, there is provided in accordance with the present invention a first group of heating filaments printed on a main section of a wrap-around type rear windowscreen; second and third groups of heating filaments each having a reduced width printed on side sections of the rear windowscreen between which the on side sections of the rear windowscreen between which the main section is interposed; the second and third groups of heating filaments being integrally connected, in one to one relation, to the first group of heating filaments at ridges of the windowscreen, by which ridges the main section and the side sections are bound respectively; first highly conductive strips, to which the second and third groups of heating filaments are terminated, printed on the respective side sections; second highly conductive strips printed on the ridges to extend along the same while crossing the connecting parts of the first and second, and the first and third groups of heating filaments to connect the same; and third highly conductive strips printed on the side sections to connect, respectively, the tops and bottoms of the first and second highly conductive strips.

BRIEF DESCRIPTION OF THE DRAWINGS

FIG. 1 is a perspective view of a wrap-around type rear windowscreen on which heating filaments constituting a conventional printing pattern are attached or printed;

FIG. 2 is a view similar to FIG. 1, but showing a preferred embodiment of the invention; and FIG. 3 is a sectional view taken along the line III—III of FIG. 2;

FIG. 4 is an elevation view of a part enclosed by a circle E shown in FIG. 2.

DESCRIPTION OF THE PRIOR ART

Prior to describing in detail the construction of the wrap-around type rear windowscreen having heating filaments according to the present invention, outlined explanation of a prior art windowscreen with heating filaments will be made with reference to FIG. 1 in order to clarify the invention.

Referring to FIG. 1, there is illustrated a vehicular wrap-around type rear windowscreen 12 on which heating filaments 10 constituting a conventional printing pattern are printed. The rear windowscreen 12 hereinshown comprises a gently sloping main section 12a and two steeply sloping side sections 12b and 12c between which the main section 12a is interposed to form a wrap around type rear windowscreen. As shown, each of the side sections 12b and 12c is inclined with respect to the main section 12a. The heating filaments 10 used have the same size in width and thickness therethroughout and are printed on the inside surface of the windowscreen 12 so as to be parallel with each other throughout the main and side sections 12a, 12b and 12c. Denoted by numerals 14a and 14b are terminal portions through which a given current from a battery (not shown) is applied to the filaments 10.

In this type printing pattern, it is usual that the number of heating filaments 10, the size, that is, width, of each filaments 10 and distance between adjacent filaments 10 are determined so as not to disturb markedly the rear view provided via the main section 12a of the windowscreen 12. This sometimes induces a problem in which the heating filaments 10 located on each of the side sections 12b and 12c are caused to close considerably to each other due to the steeply sloping construction of the side sections, thereby not only disturbing the view provided through the side sections 12b and 12c but also affecting the appearance of them.

One of measures to solve the above-mentioned problem is to reduce the width of each filaments positioned on the side sections 12b and 12c. However, in this case, the electric resistance of the filaments on the side sections 12b and 12c is increased, so that the voltage applied to the filaments on the main section 12a is decreased to cause reduction of the heat generation at the main section 12a. This means that the demisting effect at the main section 12a of the rear windowscreen 12 becomes insufficient, resulting in that the mist condensed on the main section 12a cannot be quickly removed.

DESCRIPTION OF THE INVENTION

As has been mentioned, to eliminate the abovementioned problems is an essential object of the invention.

Referring to FIGS. 2 and 3, especially FIG. 2, there is shown a wrap-around type rear windowscreen with heating filaments according to the present invention. The filaments are printed on the inside of the windowscreen. For facilitation of the drawings and description, substantially the same parts as in FIG. 11 will be denoted by the same numberals and their detailed explanation will be omitted from the following.

The heating filaments 10 on the windowscreen according to the invention comprise a first group of filaments 10a arranged on the main section 12a, a second group of filaments 10b arranged on the side section 12b and a third group of filaments 10c arranged on the other side section 12c. Similar to the case of FIG. 1, the filaments 10 are arranged parallel with each other throughout the windowscreen 12, and the filaments 10a on the main section 12a are integrally connected at both ends with the corresponding filaments 10b and 10c on the side sections 12b and 12c in one to one relation, as shown. The filaments 10b and 10c on the side sections 12b and 12c are the same in width, but smaller in width than the filaments 10a on the main section 12a, as shown by FIG. 4 so that the electric resistance of each filament 10b or 10c is higher than that of the filament 10a.

Two strips 16a and 16b made of highly conductive material are printed inside on the ridges of the windowscreen 12 to extend along the same, by which ridges the main section 12a and the side sections 12b and 12c are bound, in a manner that the strips 16a and 16b cross the row of the filaments 10 to connect the same at positions where the filaments 10a of the first group and the filaments 10b and 10c of the second and third groups are joined. Other two strips 18a and 18b of highly conductive material are printed inside on the edges of the respective side sections 12b and 12c to vertically extend along the edges. The leading ends of the filaments 10 are terminated by the strips 18a and 18b as shown. The strips 18a and 18b are respectively provided with terminal portions 14a and 14b to which lead wires (not shown) from a battery (not shown) are connected. Thus, the strips 18a and 18b act as bus bars. Preferably, these strips 18a and 18b are made wide for the reason which will become clear hereinlater.

Two short strips 20a and 20b made of highly conductive material are printed inside on the upper edges of the respective side sections 12b and 12c to connect the upwardly leading ends of the strips 16a, 18a, and 16b, 18b, respectively. Two long strips 22a and 22b made of highly conductive material are printed inside on the lower edges of the side sections 12b and 12c to connect the downwardly leading ends of the strips 16a and 18a, and 16b and 18b, respectively. Preferably, the strips 18a, 18b, 20a, 20b, 22a and 22b are formed to have the same size in both thickness and width, and the width of each strip 16a or 16b is less than that of the others. If desired, the short strips 20a and 20b or the long strips 22a and 22b may be removed.

When feeding electric power to the filaments 10 via the terminal portions 14a and 14b, heat is generated to warm the surface of the rear windowscreen 12 for demisting. It should be now noted that the provision of the highly conductive strips 20a, 20b, 22a and 22b into the second and third groups of filaments 10b and 10c in a parallel relation causes not only reduction of current flowing in the filaments 10b and 10c but also increase of current flowing in the filaments 10a, so that the degree of heating given to the side sections 12b and 12c is somewhat reduced, while the degree of heating to the main section 12a is increased in comparison with the case of FIG. 1. This means that the demisting effect of the filaments 10 appears equally on the total surface of the windowscreen 12.

In order to explain another advantage given by the invention, FIG. 3 is presented which shows a sectional view taken along the line III—III of FIG. 2. In this drawing, numerals 28, 30, 32, 34 and 36 denote a garnish, a side body panel of the vehicle, an adhesive bonding the rear windowscreen 12 to the side body panel 30, a reveal molding and a trim, respectively. Hitherto, a so-called "unsightly parts covering pattern" has been provided on the inside surface of each side section 12b or 12c to conceal such parts from a view in the direction of "A". By the invention, however, the strips 18a, 18b, 20a, 22a and 22b can act as such covering pattern because they have sufficient width to conceal such unsightly parts.

In conclusion, according to the invention, (1) equal heating effect appears on the total surface of the rear windowscreen. (2) the view provided by the side sections 12b and 12c of the windowscreen is not so much reduced because of using filament of reduced width at such sections, and (3) the strips 18a, 18b, 20a, 20b, 22a and 22b can conceal the unsightly parts located inside in the vicinity of edges of the side sections 12b and 12c.

What is claimed is:

1. An electric demister for preventing a windowscreen from being misted, said windowscreen comprising a gently sloping main section and steeply sloping side sections between which said main section is interposed so as to be inclined with respect to each of said side sections, said demister comprising:

a first group of heating filaments printed on the surface of said main section parallel with and spaced from each other;

second and third groups of heating filaments printed on the surfaces of said side sections parallel with and spaced from each other, said second and third groups of filaments being integrally connected in one-to-one relation to said first group of filaments at ridges of said windowscreen by which ridges said main section and said side sections are bound respectively, the width of each of said second and third groups of filaments being less than that of said first group of filaments so that each filament of said second and third groups has an electric resistance higher than that of said first group;

first highly conductive strips printed on said side sections respectively, each having a top end and a bottom end, the leading ends of the filaments of the second and third groups being each connected to said first highly conductive strips;

terminals respectively formed on said first highly conductive strips for connecting said strips to an electric power source;

second highly conductive strips, each having a top end and a bottom end, printed on said ridges respectively to extend along the same so as to cross the connecting parts of the filaments of said first and second groups and said first and third groups to connect the connecting parts; and third highly conductive strips printed on said side sections respectively to connect said top ends of said first and second highly conductive strips and to connect said bottom ends of said first and second highly conductive strips, the electric resistance of each of said third highly conductive strips being lower than that of each of the filaments of said second and third groups and being selected to provide uniform heating throughout said windowscreen.

2. An electric demister as claimed in claim 1, in which said first highly conductive strips extend along the side edge of said side sections.

3. An electric demister as claimed in claim 1, in which said third highly conductive strips are arranged to be parallel with the filaments of said second and third groups.

* * * * *